United States Patent
Cantrell et al.

(10) Patent No.: US 10,520,945 B2
(45) Date of Patent: Dec. 31, 2019

(54) SYSTEM AND METHOD FOR DELIVERING PRODUCTS USING LOCK BOXES VIA AUTONOMOUS GROUND VEHICLES

(71) Applicant: Walmart Apollo, LLC, Bentonville, AR (US)

(72) Inventors: Robert Cantrell, Herndon, VA (US); Brian McHale, Oldham (GB); John J. O'Brien, Farmington, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/264,351

(22) Filed: Jan. 31, 2019

(65) Prior Publication Data
US 2019/0235508 A1    Aug. 1, 2019

Related U.S. Application Data (60) Provisional application No. 62/624,731, filed on Jan. 31, 2018.

(51) Int. Cl.
*G05D 1/02* (2006.01)
*G06Q 10/08* (2012.01)
*G07C 9/00* (2006.01)
*B60P 3/00* (2006.01)

(52) U.S. Cl.
CPC ............ *G05D 1/0212* (2013.01); *B60P 3/007* (2013.01); *G05D 1/0278* (2013.01); *G06Q 10/08355* (2013.01); *G07C 9/00912* (2013.01)

(58) Field of Classification Search
CPC ...... G05D 1/0212; G05D 1/0278; B60P 3/007; G06Q 10/08355; G07C 9/00912; B62B 3/02; B62B 3/022; B62B 3/025; B62B 3/027; B65D 7/00
See application file for complete search history.

(56) References Cited

U.S. PATENT DOCUMENTS

| | | |
|---|---|---|
| 8,204,624 B2 | 6/2012 | Zini et al. |
| 9,244,147 B1 | 1/2016 | Soundararajan et al. |
| 9,550,561 B1 | 1/2017 | Beckman et al. |

(Continued)

FOREIGN PATENT DOCUMENTS

| | | |
|---|---|---|
| CN | 105606481 A | 5/2016 |

OTHER PUBLICATIONS

Mathew et al., "Planning Paths for Packages Delivery in Heterogeneous Multirobot Teams", IEEE Transactions on Automation Science and Engineering, vol. 12, No. 4, Oct. 2015, pp. 1298-1308.

(Continued)

*Primary Examiner* — Aaron L Troost
(74) *Attorney, Agent, or Firm* — Venable LLP; Jeffri A. Kaminski (57) ABSTRACT

A method for unloading and loading a lock box are provided. An autonomous ground vehicle (AGV) stores a lock box to be delivered. The lock box includes a box body, a first set of stands and a second set of stands, and a first set of wheels and a second set of wheels. The first set of stands can extend of the lock box outwardly to contact the ground. The second set of stands can extend out of the lock box outwardly to contact the ground. It is determined that the package has been removed from the lock box and the lock box is automatically loaded onto the AGV.

20 Claims, 8 Drawing Sheets

(56) References Cited

U.S. PATENT DOCUMENTS

| | | | |
|---|---|---|---|
| 9,849,582 B2* | 12/2017 | Cheff | ............... B25H 1/04 |
| 10,131,373 B1* | 11/2018 | Ness | ............... B62B 5/0003 |
| 2015/0006005 A1 | 1/2015 | Yu et al. | |
| 2015/0145643 A1 | 5/2015 | Fadell et al. | |

OTHER PUBLICATIONS

International Search Report and Written Opinion dated Apr. 16, 2019, issued in corresponding PCT Application No. PCT/US2019/016091.

"Rinspeed Snap", youtube.com, Rinspeed 2018, pp. 1.

"Self-Driving Vehicles in Logistics", DHL Trend Research 2014, pp. 1-39.

Stefan Schrahe, "On new Paths", vision Magazine, Dec. 15, 2017. pp. 1-13.

John Orr, "Startup Tests Robot Delivery Vehicle in California City", Palo Alto Daily News, Sep. 1, 2017, pp. 1-5.

"Last Mile Delivery: Current Improvements and Future Directions", Ivymobility, Feb. 7, 2018. pp. 1-6.

Martin Joerss et al., "Parcel delivery, The future of last mile", McKinsey Company, Sep. 2016, pp. 1-30.

\* cited by examiner

SYSTEM AND METHOD FOR DELIVERING PRODUCTS USING LOCK BOXES VIA AUTONOMOUS GROUND VEHICLES

CROSS-REFERENCE TO RELATED APPLICATION

This application claims the benefit of U.S. Provisional Patent Application No. 62/624,731, filed on Jan. 31, 2018, which is incorporated herein by reference in its entirety.

TECHNICAL FIELD

The present disclosure relates to delivery lock boxes, and more specifically to loading and unloading delivery lock boxes onto autonomous ground vehicles (AGVs).

BACKGROUND

Vehicles such as Autonomous ground vehicles (AGVs) or unmanned aerial vehicles (UAVs) (e.g. drones) are generally vehicles that operate without a human pilot aboard. Drones can be used for performing surveillance, reconnaissance, and exploration tasks for military and civilian applications. The use of drones for package delivery has become more prevalent in society.

AGVs may be utilized in conjunction with UAVs in a package delivery system, wherein the AGV may move, without a human driver aboard, throughout a geographic area in order to deliver packages to physical locations designated by customers. AGVs may include a storage area for storing items to be delivered. AGV efficiency is limited if the vehicle can carry only one load at a time or if it must wait for a person to empty the load before it returns. Additionally, mechanisms for transferring goods from the AGV to a secure locker may be complex. Therefore, there is a need to allow an AGV to carry multiple loads and to drop them off securely at physical locations designated by customers without requiring long wait times for the AGV.

SUMMARY

An example system configured according to the concepts and principles disclosed herein can include: a lock box stored in an autonomous ground vehicle (AGV), the lock box comprising: a box body detecting a space therein and storing a package to be delivered; a first set of stands and a second set of stands extending from a bottom of the box body, the first set of stands and the second set of stands being configured to support the box body when extended; and a first set of wheels and a second set of wheels coupled to the first set of stands and the second set of stands at respective ends; the AGV comprising: at least one sensor configured to detect a location of a center of gravity of the lock box; a processor; and a memory coupled to the processor and storing program instructions that when executed by the processor and based on a sensor detection, cause the processor to instruct the lock box to perform operations comprising: moving the lock box out of the AGV when the center of gravity of the lock box is in the AGV; extending the first set of stands of the lock box outwardly to contact the ground via the first set of wheels when the center of gravity of the lock box is in the AGV; extending the second set of stands of the lock box outwardly to contact the ground via the second set of wheels when the lock box is supported by AGV; determining that the package has been removed from the lock box; and automatically loading the lock box onto the AGV.

An example method of performing concepts disclosed herein can include: providing an autonomous ground vehicle (AGV) storing a lock box to be delivered, the AGV comprising: at least one sensor configured to detect a location of a center of gravity of the lock box; a processor; and a memory coupled to the processor and storing program instructions that when executed by the processor and based on a sensor detection, cause the processor to instruct the lock box to perform operations comprising: moving out of the AGV when the center of gravity of the lock box is in the AGV, wherein the lock box comprises: a box body detecting a space therein and to storing a package to be delivered; a first set of stands and a second set of stands extending from a bottom of the box body, the first set of stands and the second set of stands being configured to support the box body when extended; and a first set of wheels and a second set of wheels coupled to the first set of stands and the second set of stands at respective ends, extending the first set of stands of the lock box outwardly to contact the ground via the first set of wheels when the center of gravity of the lock box is still in the AGV; extending the second set of stands of the lock box outwardly to contact the ground via the second set of wheels when the lock box is supported by a lip of the AGV; determining that the package has been removed from the lock box; and automatically loading the lock box onto the AGV.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Example embodiments of this disclosure are illustrated by way of an example and not limited in the figures of the accompanying drawings, in which like references indicate similar elements and in which.

It is to be understood that both the foregoing general description and the following detailed description are example and explanatory and are intended to provide further explanations of the invention as claimed only and are, therefore, not intended to necessarily limit the scope of the disclosure.

DETAILED DESCRIPTION

Various example embodiments of the present disclosure will be described in detail below with reference to the accompanying drawings. Throughout the specification, like reference numerals denote like elements having the same or similar functions. While specific implementations and example embodiments are described, it should be understood that this is done for illustration purposes only. Other components and configurations may be used without parting from the spirit and scope of the disclosure, and can be implemented in combinations of the variations provided. These variations shall be described herein as the various embodiments are set forth.

Systems and methods provided in this disclosure are capable of enabling an AGV to automatically unload and load secure lock boxes (e.g., lock boxes). In various embodiments, as will be described in detail below, lock boxes are provided to facilitate transferring and delivering goods or products via an AGV. The AGV may carry lock boxes containing products purchased by the customer from, or returned to, a merchant. Each lock box may have stands to keep the lock box at the best height for drop off and retrieval from the AGV. The stands of the lock box may be lowered or raised in concert with the lock box being loaded or unloaded so that the lock box is always supported by either stands or the AGV. In some example embodiments, multiple lock boxes may be nested inside the AGV where the lock boxes form a part of the cargo load space. In some embodiments, multiple lock boxes may be loaded onto forks attached to the front or sides of the AGV. Multiple lock boxes may be loaded on top of the AGV cartridge-style in an order of pickup or retrieval.

The system may create a well-defined AGV package delivery structure to maintain continuous and efficient operations. The disclosed systems and methods also provide a secure and efficient way to automatically pick up, transport, and deliver lock boxes to delivery destinations without having to wait for the delivered items to be retrieved. In some example embodiments, an AGV may employ multiple roles during a lock box delivery routing. For example, an AGV may retrieve lock boxes from a general package delivery truck and automatically deliver the lock boxes to different delivery destinations so that the general package delivery truck is not required to make multiple stops for delivering the lock boxes.

Figure 1:
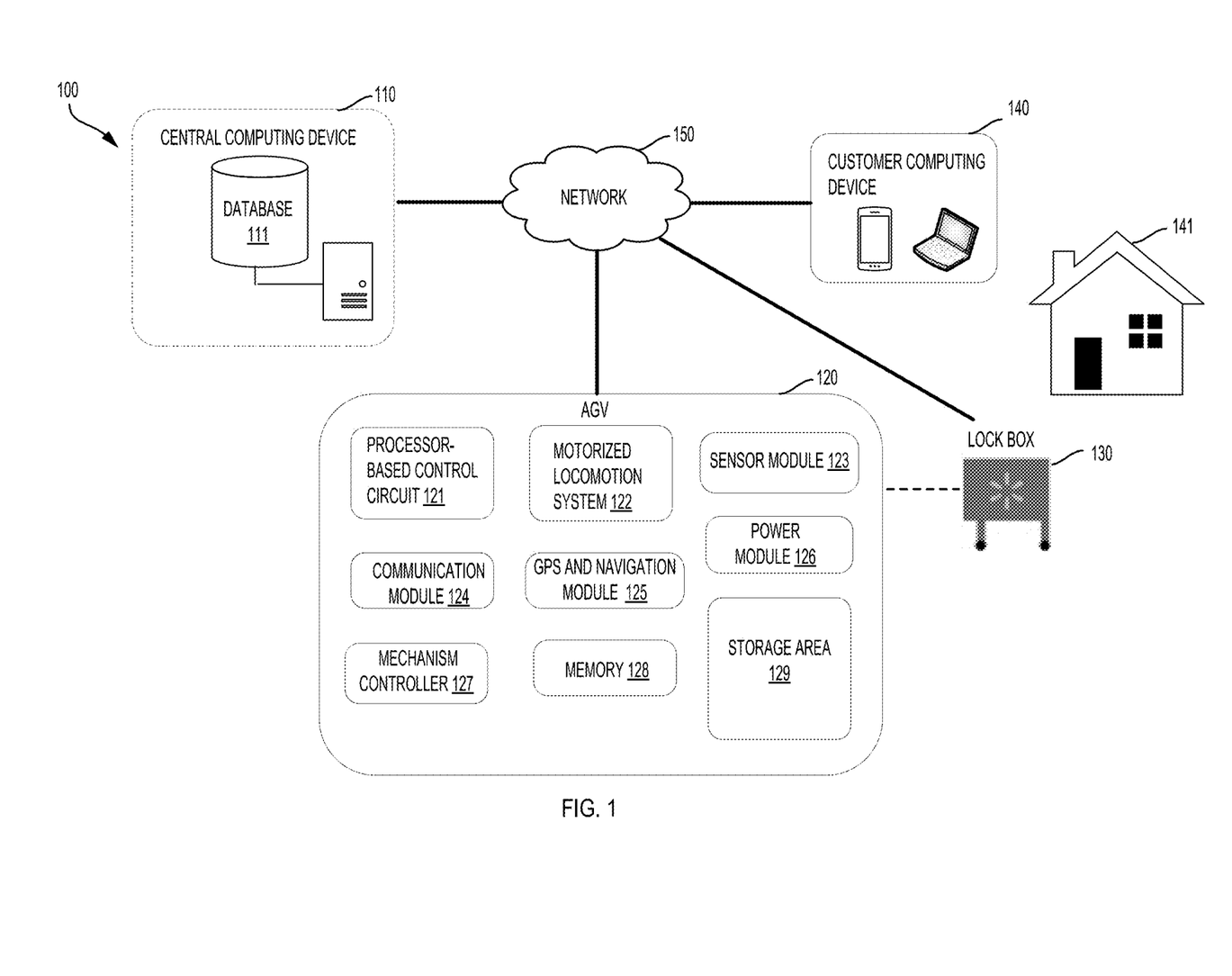
FIG. 1 is a diagram illustrating an example system environment in accordance with some example embodiments.

FIG. 1 is a block diagram illustrating an example system environment 100 that enables an AGV to transport, drop off, and/or pick up lock boxes in accordance with some embodiments. The example system environment 100 generally includes a central computing device 110, an AGV 120, a lock box 130, a customer computing device 140, and a network 150.

The central computing device 110 may operate as a retailer remote command and control center to process a customer's purchase order, send delivery instruction to the AGV 120, and control delivering, via the AGV 120, the lock box 130 containing one or more products to a product package delivery destination 141 (i.e., delivery destination).

The central computing device 110 may operate with a network-accessible computing system which can be implemented as a computing infrastructure of one or more servers and databases including processors, memory (data storage), software, data access interface, and other components. One or more servers and databases are accessible via any type of wireless or wired networks. One or more servers is referred to as the central computing device 110 for simplicity, and one or more databases is referred to as a database 111 herein for simplicity. The central computing device 110 may include one or more processors and memory which may be utilized to operate a drone and AGV management system. The database 111 can include computer-executable instructions that describe software or applications for providing access to and communication with the AGV 120, the lock box 130 and the customer computing device 140 via the network 150. For example, the central computing device 110 may be configured to track the geographic locations of the AGV 120, the lock box 130, and the customer computing device 140. The central computing device 110 may be configured to control, in whole or in part, the operations of the AGV 120 and the lock box 130 via the network 150.

The AGV 120 is configured to travel along a delivery route to a delivery destination 141, such as a customer residence, customer business location, or other customer designated pick up location. The AGV 120 may include a computing device which is operated with processor-controlled electronic circuit 121 (e.g., control circuit) to implement various AGV control aspects of specific functions and operations. The AGV control circuit 121 includes one or more processors coupled to memory 128 (data storage) configured to store executable software instructions, programs, applications, data, AGV travel paths, and/or data items accessible by the processor(s).

The AGV 120 includes certain conventional components that allow it to transport, delivery, and pick up lock boxes 130. For example, the AGV 120 includes a motorized locomotion system 122 communicatively coupled to the control circuit 121. The motorized locomotion system 122 may include wheels, a motor, a drive mechanism coupled to the wheels, and a power source to enable operation of the wheels and drive the mechanism. The motorized locomotion system 122 is controlled by the control circuit 121 and configured to facilitate movement of the AGV 120.

The AGV 120 may also include different functional systems and modules, such as sensor module 123, communication module 124, GPS and navigation module 125, power module 126, mechanism controller 127, and other electrical or mechanical components. The modules may also include various circuits and one or more software components, programs, applications, or other units of code instructions configured to be executed by one or more processors. Each AGV functional system or module typically includes specific electronic circuits and/or mechanical components configured to be communicatively coupled to the control circuits 121 to implement the control aspects of particular functions and operations. For example, the communication module 124 may be communicatively coupled to the control circuit 121 to enable the AGV 120 to communicate with various computing devices in the system environment 100 for receiving instructions and updating the delivery status, AGV location information, etc. The communication module or system may utilize cellular, radio frequency, near field communication, infrared, Bluetooth, Wi-Fi, satellite, or any other means for the AGV 120 to communicate with different computing devices in the system environment 100.

The sensor module 123 may include one or more visual sensors, proximity sensors, and other types of sensors. These visual sensors and proximity sensors may be placed on one or more surfaces of the AGVs to detect nearby objects. The sensors of the AGV 120 may be capable of sensing and determining where the lock box 130 is located and a distance between the lock box 130 and a predetermined position on the AGV. The sensors of the AGV 120 may be capable of determining a direction and a speed of a traveling or moving object (for example, another AGV or lock box).

The AGV 120 may include a Global Positioning System (GPS) and navigation module 125 which may be configured to be communicatively coupled to the control circuit 121 to determine a geographic location of the AGV 120, to guide the AGV 120 navigating to the delivery destination, and to cooperate with the processor to conduct specific operations and/or data analysis.

The mechanism controller 127 may include a slide, conveyor and various mechanical components, or any combination thereof. The mechanism controller 127 may be communicatively coupled to the control circuit 121 to implement various operations associated with the lock box. The mechanism controller 127 may be configured to secure, lock, load, and release the lock box 130 stored in the AGV. There may be various means available within the AGV to push, pull, or otherwise convey a lock box located inside or outside the AGV inclusive of gravity and friction with respect to the stands. For example, the mechanism controller 127 may be configured to load and release a lock box to a door of the AGV.

The AGV 120 may include a storage area 129 which may be configured to hold at least one lock box 130 to be transported and delivered by the AGV 120. The storage area 129 may be any of various physical sizes and geometries. The lock box 130 is configured to receive packages/or products ordered by a customer. As will be described in more detail below, the storage area 129 may be configured to hold multiple lock boxes nested together in the AGV. For example, the storage area 129 may include a fork assembly attached to a shelf or bottom of the AGV 120 towards the front or sides of the AGV 120.

The network 150 may include satellite-based navigation system or a terrestrial wireless network, Wi-Fi, and any other type of wired or wireless networks to facilitate communications between the various electronic devices or computing devices associated with the example system environment 100. The network 150 may include satellite-based navigation system or a terrestrial wireless network, Wi-Fi, and other type of wired or wireless networks to facilitate communications between the various networks devices associated with example system environment 100. In some example embodiments, the central computing device 110, the AGV 120, the lock box 130, and the customer computing device 140 may communicate with each other via the network 150 to complete missions for delivering one or more products or conduct specific operations.

In the example system environment 100, one or more lock boxes 130 may be provided to facilitate transferring and delivering product packages. The lock box 130 may be stored in the AGV 120 and easily accessible through top, a side door of AGV 120 or otherwise.

In some embodiments, a lock box may be essentially configured to be a wheel-less AGV that shares mobility inherent in the wheeled AGV when the lock box is stored in the AGV and/or is unloaded from and loaded onto the AGV. In some embodiments, the lock box may be essentially configured to share mobility inherent in the wheeled AGV when the lock box moves on the ground. For example, the lock box may include a computing device which is operated with processor-controlled electronic circuit (e.g., control circuit) of the lock box. The control circuit of the lock box may include a processor and a memory coupled to the processor for executing stored executable instructions. The lock box may also include a motorized locomotion system including wheels, a motor, a drive mechanism coupled to the wheels, and a power source to enable operation of the wheels and drive the mechanism. The motorized locomotion system is controlled by the control circuit of the lock box and configured to facilitate movement of the lock box. In one configuration, the AGV may send an electronic instruction via the AGV control circuit and the network to the lock box to guide the lock box's movement. The lock box may rely on its own system to automatically navigate in a delivery destination area based on the received instructions. In some example embodiments, the lock box may have partial mobility. In some example embodiments, the lock box may have restricted mobility.

A lock box 130 may include a GPS module in communicate with the AGV 120 and the central computing devices via the network 150 such that the AGV 120 or the central computing device 110 may verify the GPS or geographic location of the lock box 130 to secure the package delivery. For example, the lock box 130 may only be allowed to be at a particular geographic location before the stored items being retrieved.

In some example embodiments, the lock box 130 may also include one or more visual sensors, proximity sensors, and other types of sensors. These visual sensors and proximity sensors may be placed in and/or on one or more surfaces of the lock box 130 to detect nearby objects and to determine a distance to a predetermined position of the lock box. The sensors of the lock box 130 may detect and provide various lock box status information, such as location information, empty status, and folding status, etc. A flat pack sensor may communicate and update the status with the system when the box has been emptied and flattened. The lock box may include additional assisting elements to facilitate the lock box transfer. For example, the lock boxes may be folded down after use so that a single AGV can return many empty lock boxes in one trip.

The lock box 130 may be secured by a lock that can include a mechanical or other suitable locking mechanism. In some embodiments, the lock may be communicatively coupled to the control circuit of the lock box to cause the locking mechanism to lock or unlock. The processor of the lock box may execute instructions to unlock the lock after verification information associated with the ordered products is received by the lock. The verification information may be provided by the central computing device when a customer places an order via the customer's computing device. The lock box may contain other security features, such as a camera or link to a camera. The lock box or the AGV may further include a user interface to receive verification information (such as verification code, customer identifier, etc.) from the customer for authorizing the customer to retrieve the package before allowing the lock box to be unloaded or unlocked.

In some example embodiments, the lock box may be replaced by a simple cardboard box or disposable box with no plans for retrieval. The lock box may contain an inexpensive spring-loaded stand so that fragile goods may stay level and do not drop. The lock box body may be made by substitute inexpensive materials or may just be cardboard.

The customer computing device 140 may be a mobile device, a tablet, or a computer that the customer uses to place an order and to receive a status of a requested AGV delivery and alerts of an arrival of the associated AGV delivery. The delivery destination 141 may be a customer residence, customer business location, or other customer designated pick up location, which is designated by the customer to receive the purchase order.

Figure 2A:
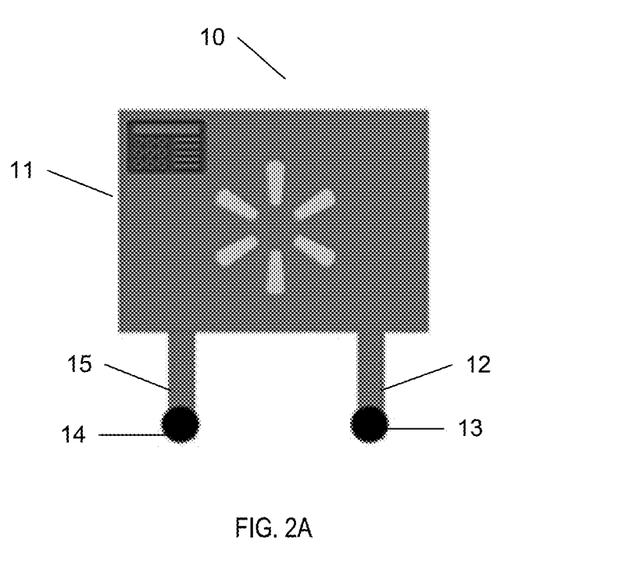
FIG. 2A shows an example lock box in accordance with some example embodiments.
Figure 2B:
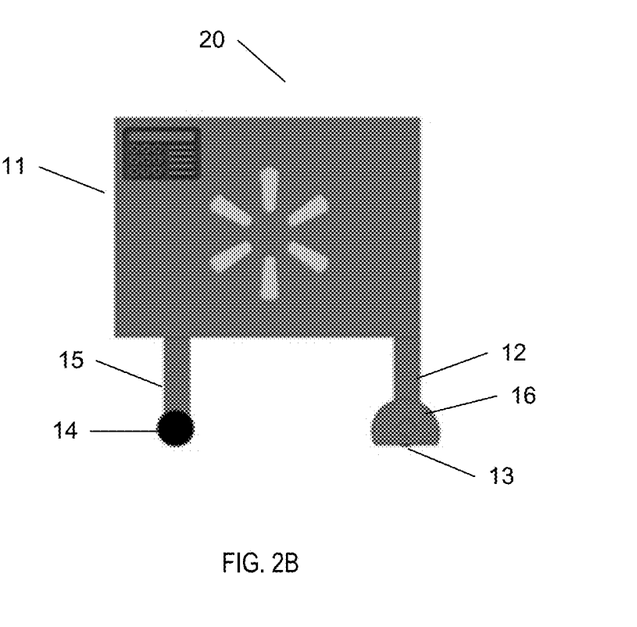
FIG. 2B shows an example lock box with a lock-down mechanism in accordance with some example embodiments.

FIG. 2A depicts an example lock box in accordance with some example embodiments. As illustrated in FIG. 2A, a lock box 10 may comprise a box body 11, a first set of stands 12, a first set of wheels 13, a second set of wheels 14, and a second set of stands 15. In some example embodiments, the box body 11 is configured to detect a space therein to store a package which may include a plurality of items. The plurality of items may be purchased by the customer from, or returned to, a merchant. The first set of stands 12 and the second set of stands 15 may be fixed or removably attached to the box body 11. The first set of stands and the second set of stands may be configured to support the box body 11. The first set of wheels 13 and the second set of wheels 14 may be coupled to the first set of stands 12 and the second set of stands 15 at respective ends. FIG. 2B depicts an example lock box with a lock-down mechanism in accordance with some example embodiments.

As shown in FIG. 2B, the lock box may comprise a lock-down mechanism 16 to keep the lock box secure by its stands while awaiting a customer pickup. In some example embodiments, a lock-down mechanism 16 may be provided or be attached separately to the stand to secure the stand of the lock box at the drop off site while awaiting a customer pickup.

FIGS. 3A, 3B, 3C, and 3D illustrate a process of unloading a lock box from an AGV 31 during a lock box delivery routing in accordance with some example embodiments.

Figure 3A:
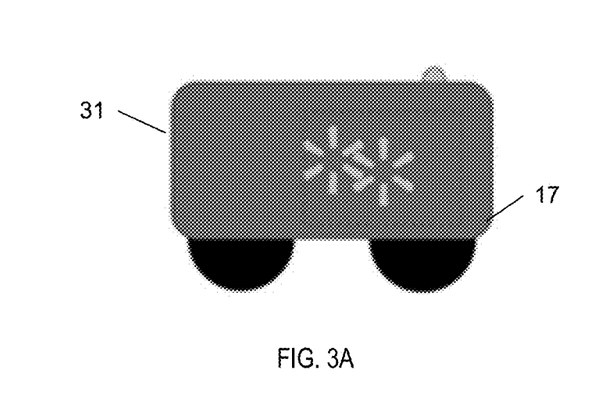
FIGS. 3A, 3B, 3C, and 3D show a process of unloading a lock box from an AGV in accordance with some example embodiments.

As shown in FIG. 3A, the lock box may be nested in AGV 31 with the stands folded to the bottom or a side of the lock box. In some example embodiments, the AGV 31 may detect whether the lock box 20 is supported by a lip 17 (a package retrieving part) of the AGV 31. The AGV 31 may detect whether the center of gravity of the lock box 20 is within the AGV 31 while unloading the lock box.

Figure 3B:
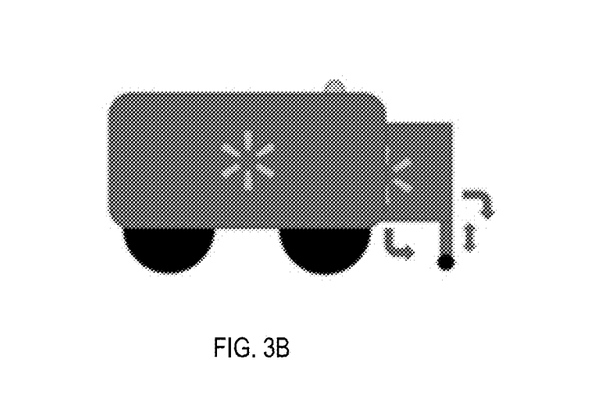
Figure 3C:
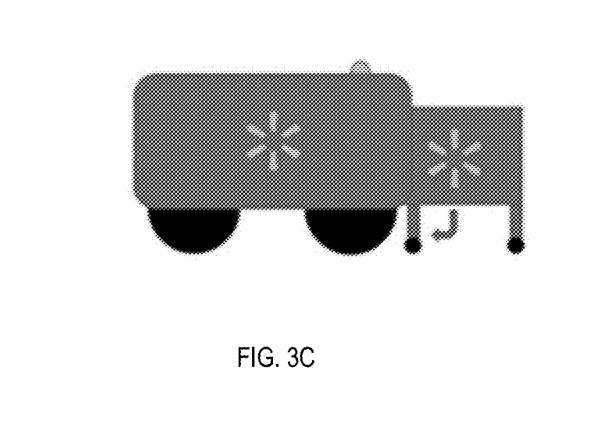

As shown in FIG. 3B, the lock box 20 is sliding out and while the center of gravity of the lock box is still in the AGV 31, the first set of wheeled stand 12 may be extended downwardly to contact the ground. The first set of stands 12 may extend to touch the ground from at least one of the side, bottom or inside of the lock box 20. As shown in FIG. 3C, as the lock box 20 slides out and while the lip 17 of AGV 31 is supported by the AGV 31, a second set of the lock box wheeled stands 15 may extend outwardly and downwardly to touch the ground. In one example embodiment illustrated in FIG. 3C, when the center of gravity of the lockbox is outside the AGV 31, the second set of stands 15 may extend outwardly to touch the ground.

Figure 3D:
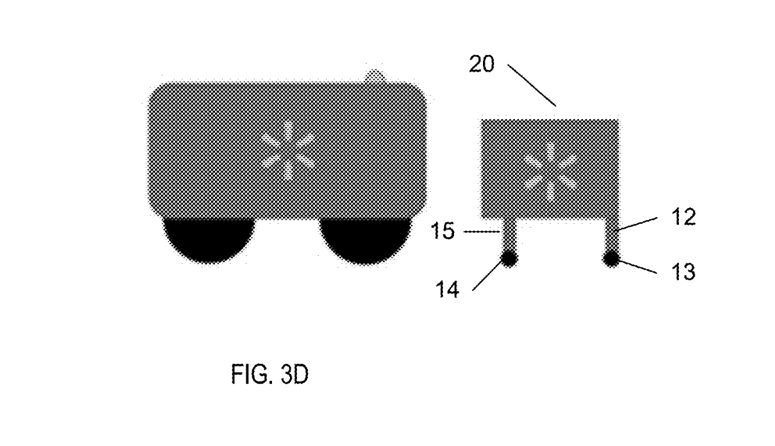

As shown in FIG. 3D, AGV 31 may drop off the lock box 20 without having to wait for the customer to retrieve the items. Based on the instructions from the center computing device 110, the AGV may return to a ground station or a package delivery facility, go to pick up an empty lock box or deliver another lock box while the delivered lock box awaits a customer pickup. The AGV may also take a reverse action to pick up and load another lock box in its place (e.g., the delivery destination) before returning to the ground station, a delivery truck, or a delivery facility. The AGV may return to pick up a lock box after detecting the package is removed by the customer.

Figure 4A:
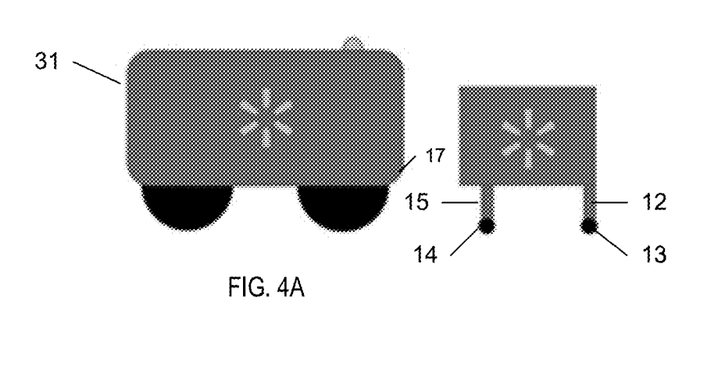
FIGS. 4A, 4B, 4C, and 4D show a process of loading a lock box onto an AGV in accordance with some example embodiments.
Figure 4B:
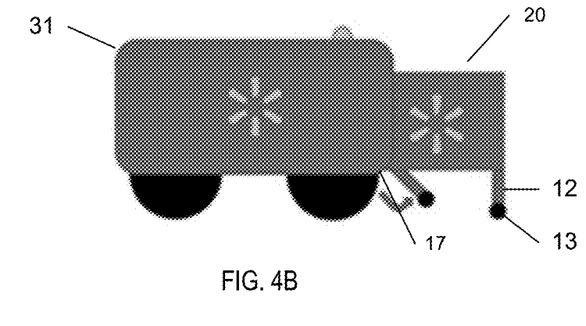
Figure 4C:
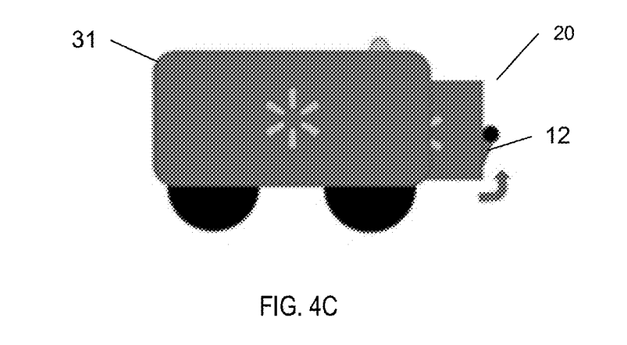
Figure 4D:
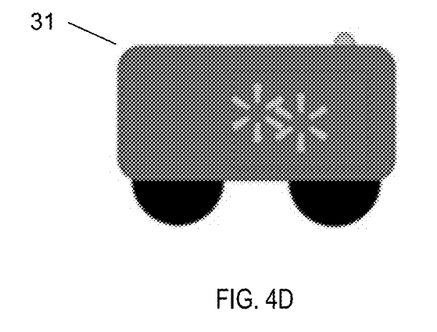

FIGS. 4A, 4B, 4C, and 4D show a process of loading a lock box onto an AGV in accordance with some example embodiments. The lock box for loading back onto the AGV may be a lock box delivered by an AGV in response to a customer's order. The lock box for loading back onto the AGV may be a lock box containing the returned product associated with a customer order. As shown in FIG. 4B, the AGV 31 may detect whether the lock box is supported by the lip 17 of the AGV 31 and whether the center of gravity of the lock box is within the AGV when loading the lock box. Once the lock box 20 is supported by the lip 17 of the AGV 31, the second set of stands 15 of the lock box 20 may retract inwardly to the bottom of the lock box 20. As shown in FIG. 4C, when the center of gravity of the lock box 20 is within the AGV 31, the first set of stands 12 may retract outwardly to the side of the lock box 20. As shown in FIG. 4D, the AGV 31 may set to move once the lock box 20 is detected by the AGV sensors to be totally loaded into the AGV 31.

Figure 5A:
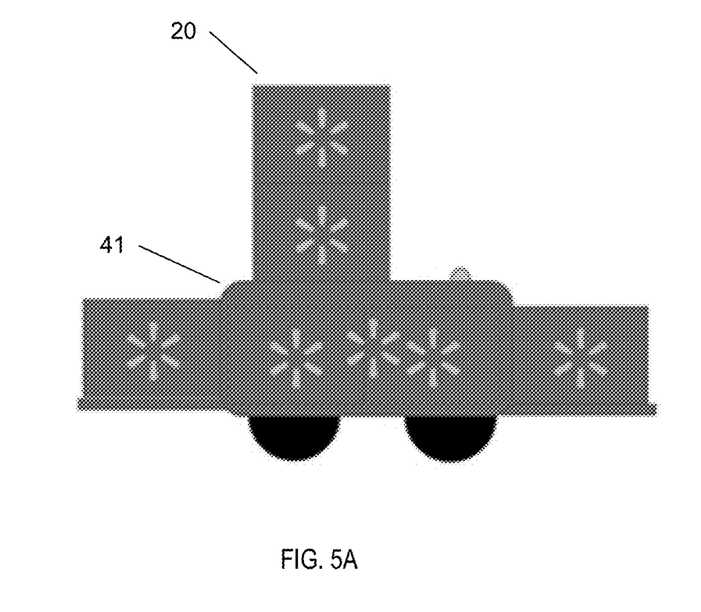
FIG. 5A depicts a diagram showing an example of nested lock boxes loaded onto an AGV in accordance with some example embodiments.

FIG. 5A depicts an example of nested lock boxes loaded onto an AGV in accordance with some example embodiments. Referring to FIG. 5A, the system may include lock boxes 21 which can be optimally nested inside the AGV body and work as a part of the body for loading. The AGV and lock boxes may be set so that the lock boxes or AGV move horizontally and each of the lock boxes itself is not lifted or lowered. For example, in one configuration, multiple lock boxes 20 may be nested inside the AGV 41 where the lock boxes become the cargo load space. In one configuration, the lock boxes can be inserted inside an AGV or a kiosk without the stands deploying. In one configuration, multiple lock boxes 130 may be loaded on top of the AGV cartridge-style in an order of pickup or retrieval. In one configuration, multiples lock boxes 130 may be loaded vertically in a cartridge style for deployment or after pickup.

Figure 5B:
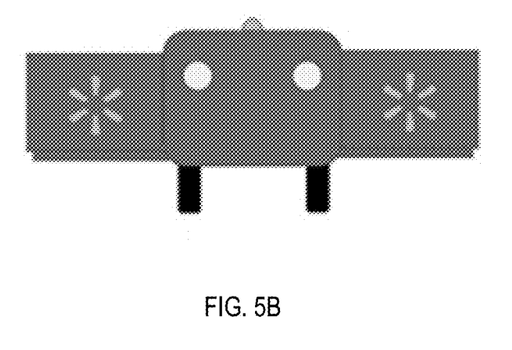
FIG. 5B depicts an example of side loading of nested lock boxes on AGV in accordance with some example embodiments.

Referring to FIG. 5B, multiple lock boxes may be unloaded from and loaded onto AGV by side loading. For example, in some configurations, multiple lock boxes may be stocked on the fork assembly towards the front or sides of the AGV and the fork assembly can hold the lock boxes.

Figure 6A:
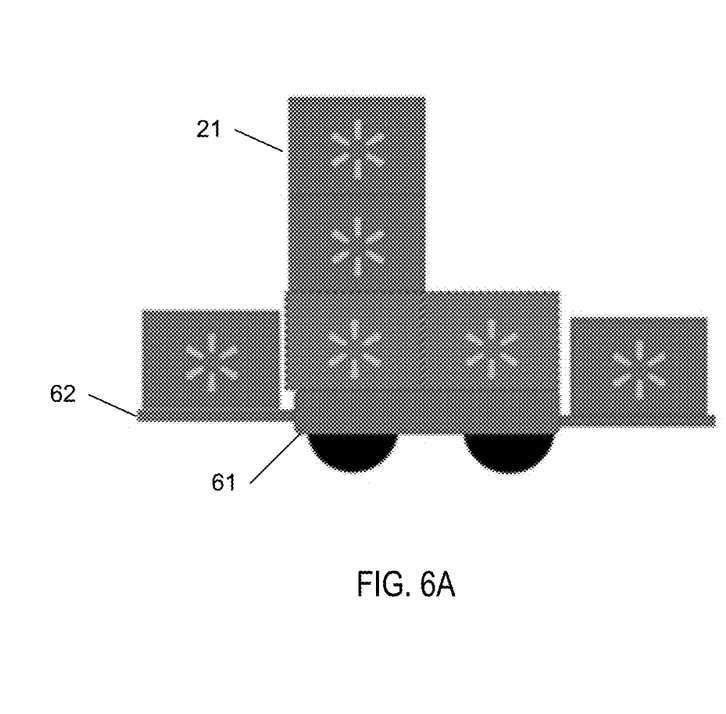
FIG. 6A depicts an example of mounted lock boxes on AGV in accordance with some example embodiments.

FIG. 6A depicts an example of mounted lock boxes on an AGV in accordance with some example embodiments. A plurality of lock boxes 21 may be mounted on a shelf 62 of the AGV 61 so that the lock boxes 21 become a part of the AGV body and the AGV 61 is essentially a frame. In this case, multiple lock boxes may be carried on, in or around a given AGV. In an example embodiment, or lock boxes may also be a UAV carrier. Multiples lock boxes may be loaded vertically in a cartridge style for deployment or after pickup. Alternatively, the lock box may be loaded onto a shelf of the AGV or inside an AGV or a kiosk. The lock box may have passive or active environmental controls and may be partitioned to properly organize various goods.

Figure 6B:
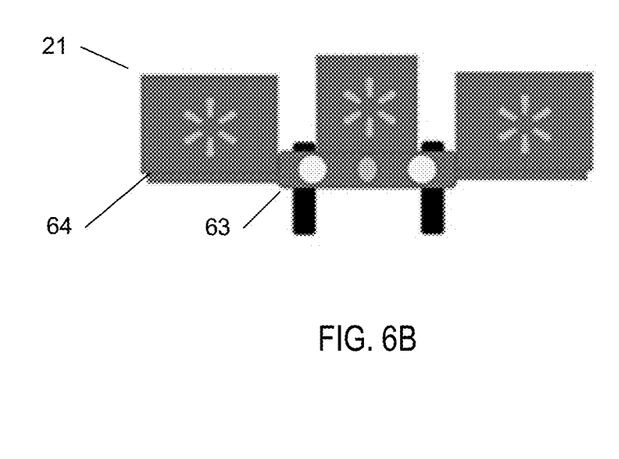
FIG. 6B depicts an example side loading of mounted lock boxes on AGV in accordance with some example embodiments.

FIG. 6B depicts an example side loading of mounted lock boxes on an AGV in accordance with some example embodiments. The plurality of lock boxes 21 are loaded onto the shelf 64 of the AGV 63 with the sides of lock boxes forming an outside shell of the AGV by no nesting. Thus, the AGV body may be reduced with the lock boxes 21 forming the outer shell.

Figure 7:
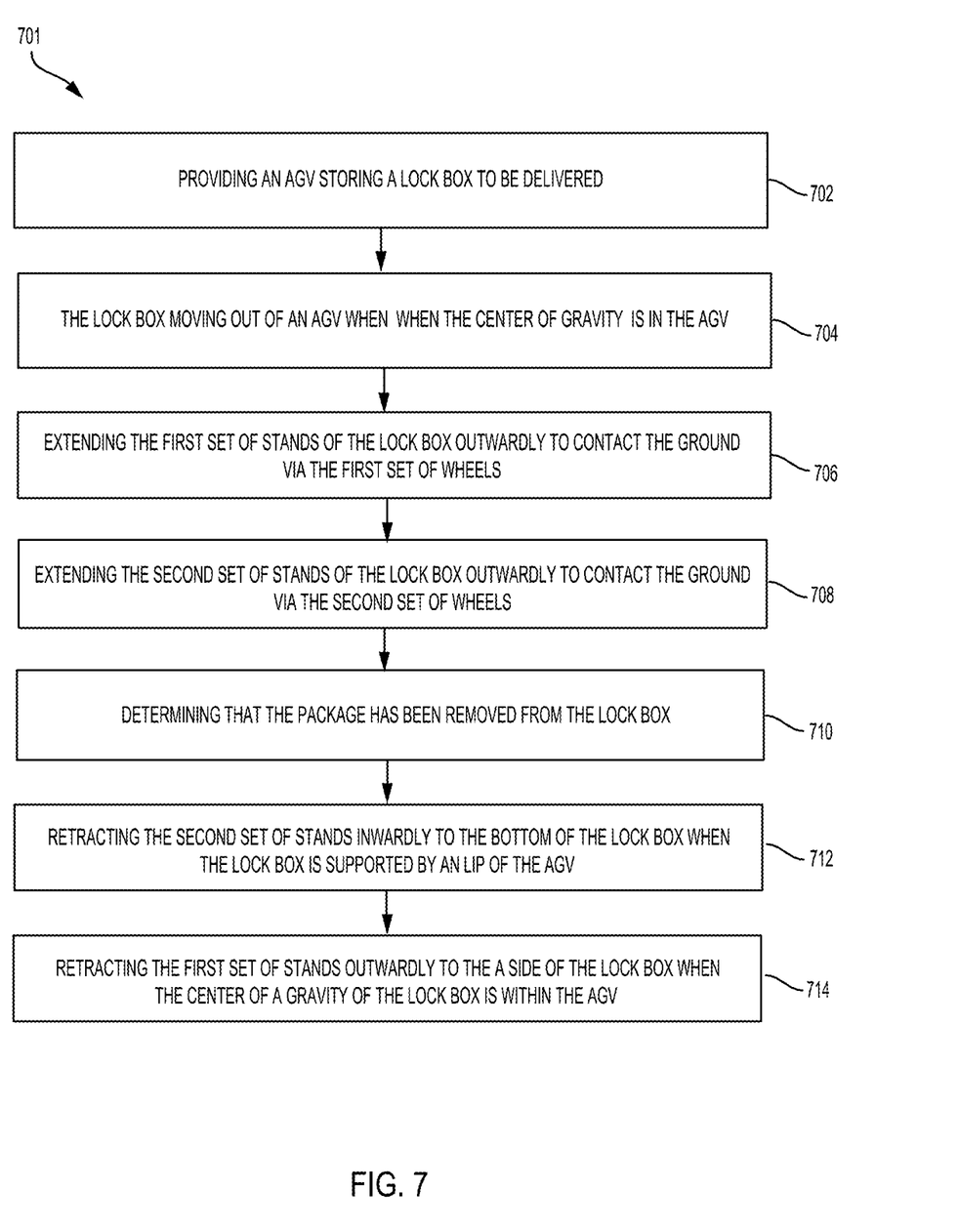
FIG. 7 is a flowchart diagram illustrating an example process for unloading and loading a lock box in accordance to some example embodiments.

FIG. 7 is a flowchart diagram illustrating an example process for unloading and loading a lock box in accordance to some example embodiments. Steps may be omitted or combined depending on the status of the locker and the operations being performed.

In step 702, by referring to FIG. 3A, an AGV storing a lock box with a package is provided for delivery to a package delivery destination. As described above with respect to the system environment 100, the AGV includes components needed for transporting the lock box to the package delivery destination. The AGV further includes components needed for performing the delivery, including a storage area for holding the lock box, sensors to detect a location and a center of gravity of the lock box stored in the AGV, a mechanism controller with various mechanical components to assist in unloading and loading the lock box, etc. When the AGV arrives at the package delivery destination, a lock box may receive an instruction from the AGV to move out of the AGV.

In step 704, the sensors of the AGV may then detect gravity of the lock box and a location of a center of gravity of the lock box. In one configuration, when the sensor detects that the center of gravity of the lockbox is still in the AGV and the package is ready for delivery, the AGV may generate and transmit electronic signals or instructions via the processor or processor-based control circuit to the lock box and instruct the lock box to move out of the AGV. The lock box may be controlled by the AGV to implement various dynamic features during the movement. For example, the lock box may be moved by the AGV's mechanism controller to the door or side of the AGV. The lock box may be controlled to slide out from the AGV along the slide. In one configuration, the lock box may automatically move to the door or side of the AGV based on the instruction received from the AGV and its own sensor detection of an arrival at the delivery destination.

In step 706, by referring to FIG. 3B, when the lock box 20 is moving out of the AGV 31 and the center of gravity of the lock box 20 is detected to be in the AGV 31, the lock box 20 may automatically extend the first set of stands 12 outwardly to contact the ground via the first set of wheels 13. The first set of stands 12 may be extended from at least one of the side, bottom or inside of the lock box 20 to touch the ground via the first set of wheels 13. In one configuration, the first set of stands 12 may extend straight and downwardly from the lock box to touch the ground. In another configuration, the first set of stands 12 may extend outwardly and downwardly from a side of the box to touch the ground. In another configuration, the first set of stands 12 may extend outwardly and downwardly from a bottom of the box to touch the ground.

In step 708, by referring to FIG. 3C, when the lock box 20 is detected to be moving out of the AGV 31 with the first set of stands 12 touching the ground and the lock box 20 is supported by the lip 17 of the AGV 31, the second set of stands 15 of the lock box 20 may automatically be extended outwardly from the bottom of the lock box to contact the ground via the second set of wheels 14. In one embodiment, while the lock box 20 is detected to be moving out of the AGV 31 and the center of gravity of the lock box 20 may be detected to be outside the AGV 31, the second set of stands 15 of the lock box 20 is extending to contact the ground.

In step 710, the sensors of the lock box 20 may detect whether the stored package is removed from the lock box 20.

Once the sensors of the lock box 20 determines that the package has been removed from the lock box 20, the sensors of the lock box 20 may transmit an electronical signal with the lock box status back to the AGV 31. The lock box may stay at the delivery destination and wait for the customer to pick up the package. A system may authenticate the customer before allowing the box to be unloaded. For example, the lock box must be at a particular geolocation before opening.

In some example embodiments, the AGV may implement tasks in parallel, such as dropping a lock box, continuously delivering the lock box while customer unloads it, and picking up the lock boxes on the way back. For example, The AGV may continue to pick up or deliver other lock boxes without waiting for the customer to retrieve the package.

When the AGV receives the confirmation that the package in the lock box 20 has been retrieved and the lock box is ready for pick up, an AGV may navigate back to the package delivery destination. The lock box may detect an arrival of the AGV within a predetermined distance and automatically route to the AGV.

As described above, the lock box may use different types of sensors to detect and determine lock box status information, such as location information, empty information; folding information. The sensors of the lock box may detect the location of the lock box and transmit the lock box status to the AGV or the control computing device in the system environment 100. In some example embodiments, the system may use the lock box status information to conduct different type of procedures to facilitate the process of the unloading and loading the lock box. For example, the process may determine a geographic location of the lock box via the sensors in the lock box; authenticate the customer by receiving customer identification information before allowing the lock box to be unloaded and opened; determine whether the package is removed from the lock box by the customer; and determine whether the box is emptied and folded. The AGV may receive the GPS data of a lock box and determine whether the package is removed from the lock box. When the AGV detects the package is removed from the lock box 20, the AGV may route to the geographic location of the lock box based on the GPS data associated with the lock box. The lock box may then be automatically loaded back onto the AGV.

In step 712, by referring to FIG. 4B, when the sensor of the AGV or lock box 20 detects that the lock box is contacted to or supported by the lip 17 of the AGV 31, the AGV determine that the lock box is ready for loading back to the AGV. The AGV may instruct the lock box to retract the second set of stands 15 inwardly to the bottom of the lock box 20.

In step 714, by referring to FIG. 4C, when the center of gravity of the lock box is detected to be within the AGV, the lock box may automatically retract the first set of stands 12 outwardly to the side of the lock box 20. The lock box may slide into the storage area of the AGV along the slide. When the lock box is moved into the AGV with the first set of stands and the set of stands retracted, the lock box may move automatically or be controlled and/or moved by the AGV's mechanism controller to the AGV storage area.

In some example embodiments, a system may provide mobile lock boxes from an AGV to customers' homes or used in a retail store. For example, a vehicle routing problem (VRP) Algorithm may be oriented on optimally moving lock boxes within the broader infrastructure of a retail store where the orientation is on keeping the lock box moving with minimal stops, to include immediate unloads or near-immediate unloads when multiple deliveries occur close together.

Figure 8:
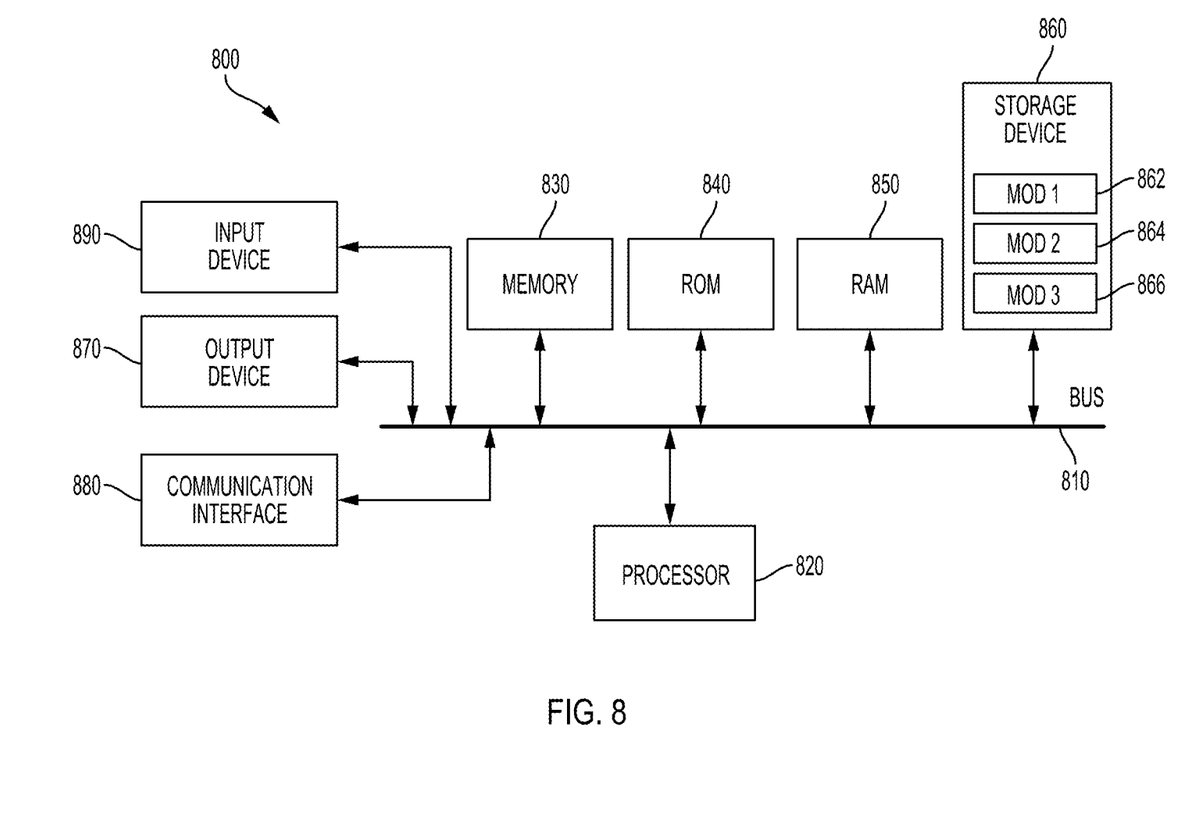
FIG. 8 is a block diagram illustrating an example computer system in which some example embodiments may be implemented.

FIG. 8 illustrates an example computer system 700 which can be used to which may be used to implement embodiments as disclosed herein. The computing system 800 may be a server, a personal computer (PC), or another type of computing device.

With reference to FIG. 8, an example system 800 can include a processing unit (CPU or processor) 820 and a system bus 810 that couples various system components including the system memory 830 such as read only memory (ROM) 840 and random access memory (RAM) 850 to the processor 820. The system 800 can include a cache of high speed memory connected directly with, in close proximity to, or integrated as part of the processor 820. The system 800 copies data from the memory 830 and/or the storage device 860 to the cache for quick access by the processor 820. In this way, the cache provides a performance boost that avoids processor 820 delays while waiting for data. These and other modules can control or be configured to control the processor 820 to perform various actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general purpose processor and a hardware module or software module, such as module 1 862, module 2 864, and module 3 866 stored in storage device 860, configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output (BIOS) stored in ROM 840 or the like, may provide the basic routine that helps to transfer information between elements within the computing device 800, such as during start-up. The computing device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer-readable storage media provide nonvolatile storage of computer-readable instructions, data structures, program modules and other data for the computing device 800. In one aspect, a hardware module that performs a particular function includes the software component stored in a tangible computer-readable storage medium in connection with the necessary hardware components, such as the processor 820, bus 810, display 870, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 800 is a small, handheld computing device, a desktop computer, or a computer server.

Although the example embodiment described herein employs the hard disk 860, other types of computer-readable media which can store data that are accessible by a computer, such as magnetic cassettes, flash memory cards, digital versatile disks, cartridges, random access memories (RAMs) 850, and read-only memory (ROM) 840, may also be used in the example operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A system comprising:
    a lock box stored in an autonomous ground vehicle (AGV), the lock box comprising:
        a box body detecting a space therein and storing a package to be delivered;
        a first set of stands and a second set of stands extending from a bottom of the box body, the first set of stands and the second set of stands being configured to support the box body when extended; and
        a first set of wheels and a second set of wheels coupled to the first set of stands and the second set of stands at respective ends;
    the AGV comprising:
        at least one sensor configured to detect a location of a center of gravity of the lock box;
        a processor; and
        a memory coupled to the processor and storing program instructions that when executed by the processor and based on a sensor detection, cause the processor to instruct the lock box to perform operations comprising:
            moving the lock box out of the AGV when the sensor detects the center of gravity of the lock box is in the AGV;
            extending the first set of stands of the lock box outwardly to contact the ground via the first set of wheels when the center of gravity of the lock box is in the AGV;
            extending the second set of stands of the lock box outwardly to contact the ground via the second set of wheels when the lock box is supported by AGV;

determining that the package has been removed from the lock box; and automatically loading the lock box onto the AGV.

2. The system of claim 1, wherein the operation of returning to the AGV further comprises:

retracting the second set of stands inwardly to the bottom of the lock box when the lock box is supported by a lip of the AGV; and retracting the first set of stands outwardly to a side of the lock box when the center of gravity of the lock box is within the AGV.

3. The system of claim 1, wherein the lock box comprises one or more sensors to provide lock box status information comprising location information, empty information, and folding information.

4. The system of claim 3, wherein the operations further comprise:

based on the lock box status information, determining a location of the lock box via the sensors in the lock box;

authenticating a customer before allowing the lock box to be unloaded and opened;

determining when the lock box has been emptied by the customer; and determining whether the lock box has been folded.

5. The system of claim 1, wherein the lock box further comprises a lock-down mechanism detached to a stand of the lock box.

6. The system of claim 1, wherein the AGV includes a mechanism controller configured to load a plurality of lock boxes to be nested inside the AGV.

7. The system of claim 6, wherein the plurality of the lock boxes are loaded by the mechanism controller onto a shelf of the AGV with sides of boxes forming an outside shell of the AGV.

8. The system of claim 1, wherein the AGV comprises a slide, a conveyor, or any combination thereof, and the lock box slides into the AGV or slides out from the AGV along the slide.

9. The system of claim 1, wherein the first set of stands and the second set of stands of the lock box are retractable to be lowered or raised.

10. The system of claim 1, wherein the lock box includes a GPS and navigation module and a communication module.

11. A computer-implemented method comprising:

providing an autonomous ground vehicle (AGV) storing a lock box to be delivered, the AGV comprising:

at least one sensor configured to detect a location of a center of gravity of the lock box;

a processor; and a memory coupled to the processor and storing program instructions that when executed by the processor and based on a sensor detection, cause the processor to instruct the lock box to perform operations comprising:

moving out of the AGV when the center of gravity of the lock box is in the AGV, wherein the lock box comprises:

a box body detecting a space therein and to storing a package to be delivered;

a first set of stands and a second set of stands extending from a bottom of the box body, the first set of stands and the second set of stands being configured to support the box body when extended; and a first set of wheels and a second set of wheels coupled to the first set of stands and the second set of stands at respective ends, extending the first set of stands of the lock box outwardly to contact the ground via the first set of wheels when the sensor detects the center of gravity of the lock box is still in the AGV;

extending the second set of stands of the lock box outwardly to contact the ground via the second set of wheels when the lock box is supported by a lip of the AGV;

determining that the package has been removed from the lock box; and automatically loading the lock box onto the AGV.

12. The computer-implemented method of claim 11, wherein the operation of loading the lock box onto the AGV, based on the sensor detection, comprises:

retracting the second set of stands inwardly to the bottom of the lock box when the lock box is supported by an lip of the AGV; and retracting the first set of stands outwardly to a side of the lock box when the center of gravity of the lock box is within the AGV.

13. The computer-implemented method of claim 11, wherein the lock box comprises one or more sensors to provide lock box status information comprising location information, empty information and folding information.

14. The computer-implemented method of claim 13, further comprises:

based on the lock box status information, determining a location of the lock box via the sensors in the lock box;

authenticating a customer before allowing the lock box to be unloaded and opened;

determining when the lock box has been emptied by the customer; and determining whether the lock box is folded.

15. The computer-implemented method of claim 11, wherein the lock box further comprises a lock-down mechanism detached to a stand of the lock box.

16. The computer-implemented method of claim 11, wherein the AGV includes a mechanism controller configured to load a plurality of the lock boxes to be nested inside the AGV.

17. The computer-implemented method of claim 11, wherein the plurality of the lock boxes are loaded onto a shelf of the AGV with sides of boxes forming an outside shell of the AGV.

18. The computer-implemented method of claim 11, wherein the AGV comprises a slide, a conveyor, or any combination thereof, and the lock box slides into the AGV or slides out from the AGV along the slide.

19. The computer-implemented method of claim 11, wherein the first set of stands and the second set of stands of the lock box are retractable to be lowered or raised.

20. The computer-implemented method of claim 11, wherein the lock box includes a GPS and navigation module and a communication module.

* * * * *